United States Patent
Xu

(10) Patent No.: US 10,814,231 B1
(45) Date of Patent: *Oct. 27, 2020

(54) SYSTEM AND METHOD FOR PROVIDING PROMOTIONS TO USERS DURING IDLE TIME

(71) Applicant: Electronic Arts Inc., Redwood City, CA (US)

(72) Inventor: Ziqiang Xu, Belmont, CA (US)

(73) Assignee: Electronic Arts Inc., Redwood City, CA (US)

( * ) Notice: Subject to any disclaimer, the term of this patent is extended or adjusted under 35 U.S.C. 154(b) by 767 days.

This patent is subject to a terminal disclaimer.

(21) Appl. No.: 15/425,121

(22) Filed: Feb. 6, 2017

Related U.S. Application Data

(63) Continuation of application No. 13/888,161, filed on May 6, 2013, now Pat. No. 9,600,150.

(51) Int. Cl.
- *A63F 13/53* (2014.01)
- *A63F 13/44* (2014.01)
- *G06F 3/0481* (2013.01)

(52) U.S. Cl.
CPC .............. *A63F 13/53* (2014.09); *A63F 13/44* (2014.09); *G06F 3/0481* (2013.01)

(58) Field of Classification Search
CPC combination set(s) only.
See application file for complete search history.

(56) References Cited

U.S. PATENT DOCUMENTS

| | | | |
|---|---|---|---|
| 5,649,862 A | 7/1997 | Sakaguchi | |
| 5,781,894 A | 7/1998 | Petrecca | |
| 6,196,920 B1 | 3/2001 | Spaur | |
| 6,615,175 B1* | 9/2003 | Gazdzinski | B66B 1/34 187/396 |
| 6,616,533 B1 | 9/2003 | Rashkovskiy | |
| 6,709,335 B2 | 3/2004 | Bates | |
| 6,729,960 B1* | 5/2004 | Matsuno | A63F 13/10 463/30 |
| 7,729,946 B2 | 6/2010 | Chu | |
| 8,107,940 B1 | 1/2012 | Jackson | |
| 8,360,873 B1 | 1/2013 | Wickett | |
| 8,449,385 B2 | 5/2013 | Mosites | |
| 8,814,662 B1 | 8/2014 | Lall | |
| 9,463,386 B1 | 10/2016 | Chapman | |
| 9,782,677 B1* | 10/2017 | Topkins | A63F 13/35 |
| 2003/0060247 A1 | 3/2003 | Goldberg | |
| 2004/0148221 A1* | 7/2004 | Chu | A63F 13/12 705/14.51 |
| 2006/0135232 A1 | 6/2006 | Willis | |
| 2006/0205460 A1* | 9/2006 | Shimosato | A63F 13/10 463/1 |
| 2007/0265046 A1 | 11/2007 | Sato | |
| 2009/0258687 A1 | 10/2009 | Weichselbaum | |

(Continued)

OTHER PUBLICATIONS

GOW_levelup.pdf, Machine Zone, Jan. 1, 2014, at http://appheroics.com/gameofwarlevelup, pp. 1-4.

(Continued)

*Primary Examiner* — Christopher J Fibbi
*Assistant Examiner* — Wendy Nicholas
(74) *Attorney, Agent, or Firm* — Knobbe, Martens, Olson & Bear, LLP

(57) ABSTRACT

A system and method for displaying auxiliary content during an idle time in a virtual space.

12 Claims, 5 Drawing Sheets

(56) References Cited

U.S. PATENT DOCUMENTS

| | | |
|---|---|---|
| 2009/0313117 A1 | 12/2009 | Hu |
| 2011/0161790 A1 | 6/2011 | Junior |
| 2011/0207529 A1 | 8/2011 | Acres |
| 2012/0122587 A1 | 5/2012 | Kelly |
| 2012/0208642 A1 | 8/2012 | Borst |
| 2012/0244945 A1 | 9/2012 | Kolo |
| 2012/0289316 A1 | 11/2012 | Luchene |
| 2012/0290409 A1 | 11/2012 | Pradeep |
| 2012/0315993 A1 | 12/2012 | Dumont |
| 2013/0014182 A1 | 1/2013 | Nussel |
| 2013/0029760 A1* | 1/2013 | Wicket Justin ......... A63F 13/12 463/29 |
| 2013/0029762 A1* | 1/2013 | Klappert ................ G06Q 30/02 463/31 |
| 2013/0217489 A1 | 8/2013 | Bendayan |
| 2013/0288757 A1 | 10/2013 | Guthridge |
| 2014/0214506 A1 | 7/2014 | VanLuchene |
| 2014/0249926 A1* | 9/2014 | Wallace ............. G06Q 30/0277 705/14.64 |
| 2014/0274409 A1 | 9/2014 | Tinsman |
| 2015/0094150 A1 | 4/2015 | Gregory |
| 2018/0361257 A1* | 12/2018 | Curtis ................... A63F 13/847 |

OTHER PUBLICATIONS

Leviathyn | Thirst of Night Review—Leviathyn [Retrieved online on Feb. 4, 2014] URL http://leviathyn.com/pc/2012/05/18/review-thirst-of-night-21, 3 pages.

Speedups.JPG [Retrieved online Feb. 4, 2014] URL Supportkq.playdemic.com/Faq/?cat=General, 1 page.

Video Button to Earn Speedups . . . -Game Support by Players for Players . . . [Retrieved online on Feb. 4, 2014] URL http://forums.playdemic.com/index.php?/topic/11666-video-button-to-earn-speedups/, 3 pages.

* cited by examiner

SYSTEM AND METHOD FOR PROVIDING PROMOTIONS TO USERS DURING IDLE TIME

FIELD OF THE DISCLOSURE

This disclosure relates to providing auxiliary content to users during an idle time in a virtual space.

BACKGROUND

Providing auxiliary content to users in virtual spaces is known; however, conventional systems do not customize the timing of auxiliary content to idle time in virtual spaces.

SUMMARY

One aspect of the disclosure relates to a system configured to provide a virtual space, in accordance with one or more implementations. Users of virtual spaces may encounter idle periods during the use of virtual spaces. During these idle periods, it may be advantageous to present users with auxiliary content. In some implementations, the system may include one or more servers. The server(s) may be configured to communicate with one or more client computing platforms according to a client/server architecture. The users may access the system and/or the virtual spaces via the client computing platforms, in for instance, one or more games.

The server may be configured to execute one or more computer program modules. The computer program modules may include one or more of a space module, an idle time module, an auxiliary content display module, an auxiliary content tracking module, a business intelligence module, and/or other modules.

The space module may be configured to execute an instance of a virtual space. The space module may be configured to implement the instance of the virtual space to facilitate participation by users in a game within the virtual space by determining view information from the instance and transmitting the view information to the client computing platforms associated with the users. The view information may facilitate the presentation of views of the virtual space to the users by the client computing platforms.

The instance of the virtual space may comprise one or more user selectable actions. A user selectable action may be associated with a wait time. A wait time associated with an action may prevent an execution of a number of corresponding actions for an amount of time after receiving a request for the action. The wait time may be static or dynamic depending on the conditions of the virtual space. The wait time may also be subject to conditions of the virtual space that cause the wait time to elapse quicker or slower than normal.

Detection of idle periods of time may be performed based on wait times associated with action requests and/or other periods of inactivity. The idle time module may be configured to detect an idle period of time based on a comparison of an amount of time left in one or more wait times, a number of wait times currently being imposed, and/or other factors. For example, an idle period of time may be detected in response to a number of wait times currently being imposed reaching or breaching a threshold number. In addition, an idle period of time may be detected in response to an amount of time left in one or more wait times being equal to or greater than a threshold amount of time. Idle time may also, for example, be detected based on a user activity level, past activity level, and/or the activity level of another user or users. Other factors may be used to detect idle periods of time.

The auxiliary content module may be configured to generate auxiliary content, including promotional material. Promotional material may include, for example, advertisements, offers, marketing materials, suggestions, and/or other promotional materials. The promotional material may take the form of, without limitation, text, sound, graphics, video, and/or other forms. The promotional material may be based on prior responses to promotional material.

The auxiliary content display module may be configured to cause auxiliary content to be presented to a user along with the view of the virtual space. In some instances, the auxiliary content may be displayed as, for example, a popup window, a message, an alert, a banner, a decision, and/or other methods for display.

The auxiliary content tracking module may be configured to track the response of users to the auxiliary content generated by the auxiliary content module. In some instances, the auxiliary content tracking module may track whether there is a response to auxiliary content, the type of content sent to the user, the time before the response, the level of interest to the auxiliary content, and/or other factors.

The business intelligence module may be configured to obtain values of user parameters for the individual users. The user parameters may include one or more of a demographic parameter, a social parameter, a game parameter, a purchase parameter, an auxiliary content response parameter, and/or other parameters. A demographic parameter may include one or more of age, sex, geographic location, language, income, education, career, marital status, and/or other demographic parameters. A social parameter may include one or more of a parameter derived from a social graph in a social network service, an in-game relationship, a platform from which the virtual space is accessed, and/or other social parameters. A game parameter may include one or more of an entity class, an entity faction, a usage amount, one or more usage times, a level, inventory in the virtual space, a score, and/or other game parameters. A purchase parameter may include a parameter determined from a purchase history of the user in the virtual space. An auxiliary content response parameter may include a one or more of a user's response to past auxiliary content, past auxiliary content, types of past auxiliary content, and/or other parameters.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
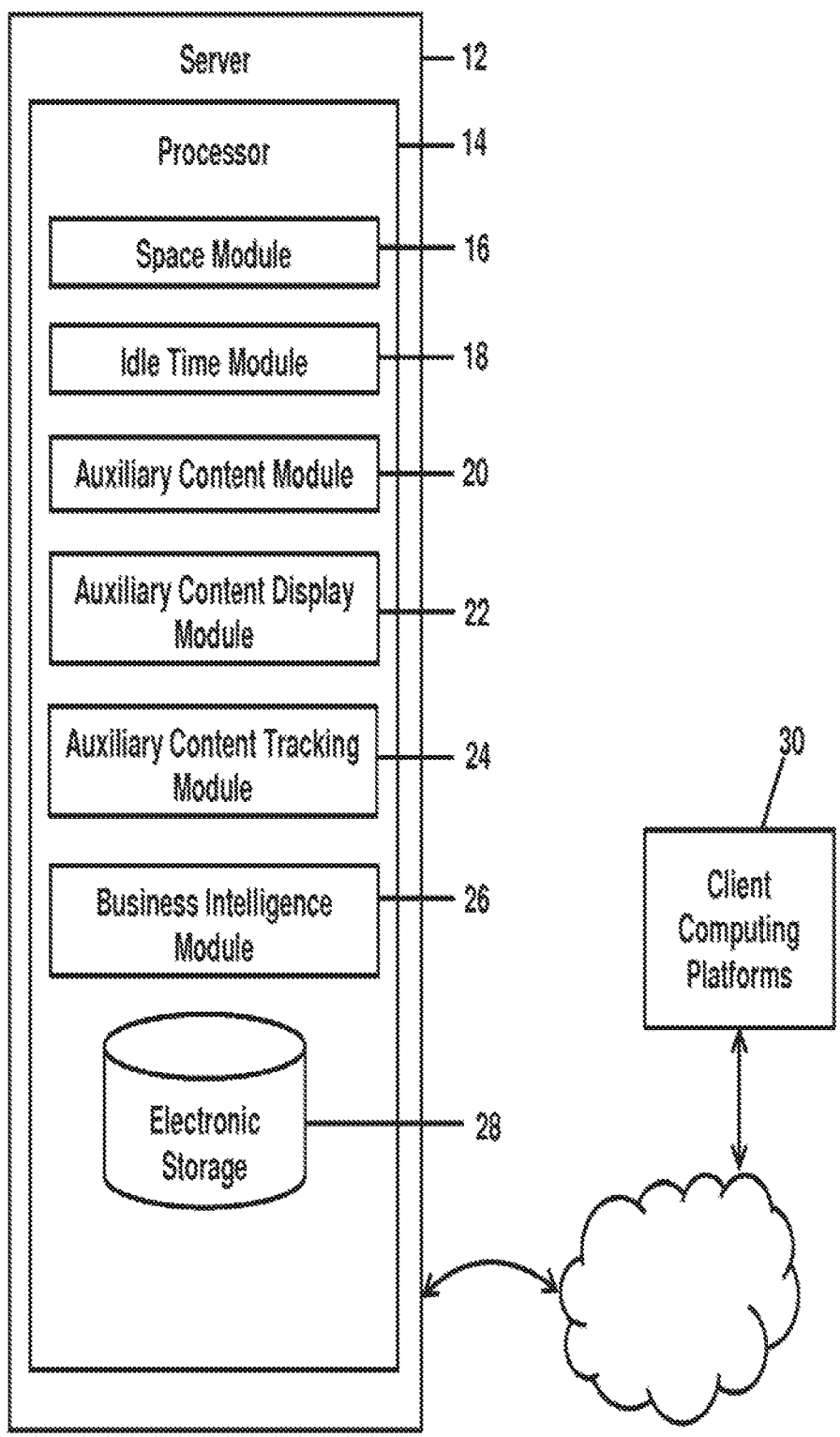
FIG. 1 illustrates a system configured to provide a virtual space, in accordance with one or more implementations.

FIG. 1 illustrates a system 10 configured to provide a virtual space to users. Providing the virtual space may include hosting the virtual space over a network. In some implementations, system 10 may include a server 12. Server 12 may be configured to communicate with one or more client computing platforms 30 according to a client/server architecture. Users may access system 10 and/or the virtual space via client computing platforms 30.

The server 12 may be configured to execute one or more computer program modules. The computer program modules may include one or more of a space module 16, an idle time module 18, an auxiliary content module 20, an auxiliary content display module 22, an auxiliary content tracking module 24, a business intelligence module 26, and/or other modules.

Space module 16 may be configured to implement an instance of the virtual space executed by the computer modules. The instance of the virtual space may reflect the state of the virtual space. The instance of the virtual space may be used to push state information to clients (e.g., client computing platforms 30) for implementation on the client, may be used to verify state information generated on client executing expressions of the instance locally, and/or for other purposes. State information may include information about the state of the virtual space such as, without limitation, position information of one or more objects, topography information, object status/shape information, battle information, score information, user or character progress information, user inventory information, user or character resource information, progress information for one or more activities or actions, view information describing a view of the virtual space, and/or other information that describes the state of the virtual space. Expressions of the instance executed on the client facilitate presentation of views on the client of the virtual space. Expressions of the instance executed on the client may be configured to simply present views of the virtual space based on the state information (e.g., via streaming view information, object/position information, and/or other state information) received from space module 16. Expressions of the instance executed on the client may include space logic that effectively provides for execution of a limited version of the instance on a client that is synchronized and/or verified with state information received from space module 16. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the virtual space may comprise one or more user selectable actions. A user selectable action may be associated with a wait time. A wait time associated with an action may prevent an execution of a number of corresponding actions for an amount of time after receiving a request for the action. In a virtual space such as an online game, a wait time may be associated with a time required to complete an action. In such cases, an action may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, and/or other actions. For example, in a game involving building virtual structures, a wait time may be associated with the time it takes for a virtual structure to be built, upgraded, and/or repaired. In another example involving a game with an aspect related to the development of a character, a wait time may be associated with the time it takes to use a skill and/or an ability such as a melee attack or a spell; and/or to interact with another player and/or a non-player character. In yet another example involving a game with an aspect related to the development of an army, a wait time may be associated with the time it takes to harvest resources and/or to build units.

A wait time may also be associated with a time required to recover from completing an in-game action. In such cases, an action may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, and/or other actions. For example, in a game involving building virtual structures, a wait time may be associated with the time it takes to recover the amount of resources spent when building, upgrading, and/or repairing a virtual structure. In another example involving a game with an aspect related to the development of a character, a wait time may be associated with the time it takes to recover energy used when activating a skill and/or an ability such as a melee attack or a spell; and/or to interact with another player and/or an non-player character. In yet another example involving a game with an aspect related to the development of an army, a wait time may be associated with the time it takes recover from requesting special limited use units, abilities, and/or powers.

In some cases, a wait time may be associated with a time required to both complete an action and recover from completing the action. In addition, a person of skill in the art will appreciate that a wait time may be static or dynamic depending on the conditions of the game. For instance and without limitation, a wait time may depend on the number of other players requesting the same action and/or a similar action type. A person of skill in the art will further appreciate that in some cases a virtual space may allow a player to queue action requests. In such cases, the wait time may be the wait time associated with one or more actions in the queue.

In some instances, wait times may be shortened or eliminated through the use of accelerators. Accelerators may include, for example, effects of actions taken by other players, the use of an in-game item, spending in-game money and/or resources, spending real world currency, spending earned or purchased, using an in-game power-up, and/or other accelerators. Accelerators may shorten wait time by, without limitation, reducing the overall wait time, accelerating the speed with which the wait time passes, shifting the wait time to another action, eliminating the wait time, and/or other methods.

In yet other instances, wait times may be lengthened through the use of penalties. Penalties may include, for example, effects of actions taken by other players, the use of an in-game item, spending in-game money and/or resources, spending real world currency, spending earned or purchased, using an in-game power-up, and/or other penalties. Penalties may lengthen a wait time by, without limitation, increasing the overall wait time, decreasing the speed with which the wait time passes, shifting the wait time from another action, and/or other methods.

In some instances, the amount of wait time remaining may be presented to the user of the virtual space. In a setting such as a game, the wait time may be presented as a countdown timer 80 and 82, a progress bar, a mask 61 and 63 overlaying an action request 60 and 62 indicating it may not be selected, and/or other methods of presenting a wait time.

In some cases, wait times may apply to subsequent requests of the same action, and in yet other cases, wait times may apply to subsequent requests of the same action type. Action types may include building structures, items, equipment, and/or units; upgrading structures, items, equipment, and/or units; repairing structures, items, equipment, and/or units; upgrading skills and/or abilities; utilizing skills and/or abilities; harvesting resources; researching technology; trading items, equipment, and/or resources; traveling; and/or other action types.

Within the instance of the virtual space executed by space module 16, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 30. The users may interact with each other through communications exchanged within the virtual space. Such communications may include one or more of textual chat, instant messages, private messages, voice communications, and/or other communications. Communications may be received and entered by the users via their respective client computing platforms 30. Communications may be routed to and from the appropriate users through server 12 (e.g., through space module 16).

The above description of the views of the virtual space determined from the instance executed by space module 16 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the limited set of graphics. For example, a view may include a generic battle graphic with a textual description of the opponents to be confronted. Other representations of individual places within the virtual space are contemplated.

An idle time module 18 may be configured to detect idle periods of time based on wait times associated with action requests and/or other periods of inactivity. In some instances, the idle time module 18 may be configured to detect an idle period of time based on a comparison of an amount of time remaining in one or more wait times, a number of wait times currently being imposed, and/or other factors. In one instance, an idle period of time may be detected in response to a number of wait times currently being imposed reaching or breaching a threshold number. In an instance where a user may queue action request, an idle period of time may be detected when a number of action requests in a queue reaches or breaches a threshold number. In yet another instance, an idle period of time may be detected in response to an amount of time remaining in one or more wait times. In this instance, the idle time may be triggered when the time remaining in one or more wait times is less than, equal to, or greater than a threshold amount of time. When a user is being subjected to more than one wait time, a comparison against the threshold time may be made using the smallest wait time, the greatest wait time, the average of the wait times, the median of the wait times, the sum of the wait times, and/or other derivations of the wait times. In a further instance, an idle time may be detected based on the rate at which wait times are being imposed. Other factors may be used to detect idle periods of time. The description of these instances is not intended to be limiting.

The idle time module 18 may be configured to monitor interactions of the users with the virtual space and/or each other within the virtual space. This may include monitoring, for a given user, areas of the virtual space the given user views or interacts with or in, other users the given user interact with, activities participated in within the virtual space, and/or other interactions of the given user with the virtual space and/or other users. In some instances, the idle time module 18 may be configured to detect an idle period of time based on a current user activity level and/or a threshold activity level. In some instances, an idle time may be detected if a current user activity level falls below a threshold activity level. In some instances, a current user activity level may be determined by a user's level of input activity for a period of time indicative of the user's current activity level. In some instances, the period of time may be the last 10 seconds, 1 minute, 5 minutes of gameplay, and/or other periods of time. In some instances, the threshold activity level may be determined by the user's level of input activity for a period of time indicative of the user's past activity level. In some instances, the threshold activity level may be one standard deviation below the user's average activity level for the last 30 minutes of gameplay. In other instances, the threshold activity level may be based on the user's average activity level, the first standard deviation above the average, the second standard deviation below the average, and/or other measurements. In other instances, the amount of prior gameplay examined may be the last 30 seconds, the last 5 minutes, the last 15 minutes, the last hour, the last week, the last month, the entire history of the user's gameplay activity, and/or other periods of time. In yet other instances, the threshold activity level may be determined based on the activity level of other users at a similar point in the game or completing a similar activity in the game. The embodiments described are not intended to be limiting.

An auxiliary content module 20 may be configured to generate promotional material and/or other auxiliary content. The auxiliary content material may relate to the virtual space or it may not. Promotional material may include advertisements, offers, marketing materials, suggestions, and/or other promotional materials. The auxiliary content may be text, sound, graphics, video, and/or other auxiliary content. The auxiliary content module may refresh the generated auxiliary content.

The auxiliary content module 20 may be configured to generate auxiliary content based on parameters including a user's past responses to auxiliary content, a user's parameters, and/or other parameters. For example, the auxiliary content module may generate promotional material of the same type as past promotional material that elicited a response from a user. In another example, the auxiliary content module may generate promotional material of a different type than past promotional material that did not elicit a response from a user. In yet another example, the auxiliary content module may generate promotional material based on a user's demographic information. These and other embodiments are contemplated.

An auxiliary content display module 22 may be configured to display auxiliary content generated by auxiliary content module 20. The auxiliary display module 22 may be configured to only display auxiliary content during an idle time detected by idle time module 18. The auxiliary content I may be incorporated into the view information used by space module 16. In some instances, the auxiliary content may be displayed as, for example, a popup window, a message, an alert, a banner, a decision, a tooltip, a question, and/or other methods for display.

An auxiliary content tracking module 24 may be configured to track the responses of users to auxiliary content generated by auxiliary content module 20. For example, this may include whether there is a response to auxiliary content, the auxiliary content sent to the user, the type of auxiliary content sent to the user, the time before the user responded to the auxiliary content, the time spent responding to the auxiliary content, the user's level of interest in the auxiliary content (e.g., by purchasing an offered virtual item(s) rather than just viewing the offered virtual item(s)), and/or tracking metrics.

A business intelligence module 26 may be configured to record user profiles and/or user parameters associated with users of the system 10. The one or more user profiles and/or user information may include information stored by server 12, one or more of the client computing platforms 30, and/or other storage location. The user profiles may include, for example, past responses to auxiliary content, information identifying users (e.g., a username or handle, a number, an identifier, and/or other identifying information) within the virtual space, virtual space account information, subscription information, virtual currency account information (e.g., related to currency held in credit for a user), virtual space usage information, interaction history among users in the virtual space, information stated by users, browsing history of users, a client computing platform identification associated with a user, a phone number associated with a user, and/or other information related to users.

The business intelligence module 26 may also be configured to obtain values of user parameters for the individual users. The user parameters may include one or more of a demographic parameter, a social parameter, a game parameter, a purchase parameter, an auxiliary content response parameter, and/or other parameters. A demographic parameter may include one or more of age, sex, geographic location, language, income, education, career, marital status, and/or other demographic parameters. A social parameter may include one or more of a parameter derived from a social graph in a social network service, an in-game relationship, a platform from which the virtual space is accessed, and/or other social parameters. A game parameter may include one or more of an entity class, an entity faction, a usage amount, one or more usage times, a level, inventory in the virtual space, a score, and/or other game parameters. A purchase parameter may include a parameter determined from a purchase history of the user in the virtual space. An auxiliary content response parameter may include a one or more of a user's response to past auxiliary content, past auxiliary content, types of past auxiliary content, and/or other parameters.

In some implementations, the server 12 and client computing platforms 30 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12 and client computing platforms 30 may be operatively linked via some other communication media.

A given client computing platform 30 may include one or more processors configured to execute computer program modules. The computer program modules may be configured to enable an expert or user associated with the given client computing platform 30 to interface with server 12, and/or provide other functionality attributed herein to client computing platforms 30. By way of non-limiting example, the given client computing platform 30 may include one or more of a desktop computer, a laptop computer, a handheld computer, a tablet computing platform, a NetBook, a Smartphone, a gaming console, and/or other computing platforms.

Server 12 may include electronic storage 28, one or more processors 14, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 28 may comprise non-transitory storage media that electronically stores information. The electronic storage media of electronic storage 28 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 14, information received from server 12, information received from client computing platforms 30, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include a plurality of processing units. These processing units may be physically located within the same device, or processor 14 may represent processing functionality of a plurality of devices operating in coordination. The processor 14 may be configured to execute modules 16, 18, 20, 22, 24, and 26. Processor 14 may be configured to execute modules 16, 18, 20, 22, 24, and 26 by software; hardware; firmware; some combination of software, hardware, and/or firmware; and/or other mechanisms for configuring processing capabilities on processor 14. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 16, 18, 20, 22, 24, and 26 are illustrated in FIG. 1 as being implemented within a single processing unit, in implementations in which processor 14 includes multiple processing units, one or more of modules 16, 18, 20, 22, 24, and 26 may be implemented remotely from the other modules. The description of the functionality provided by the different modules 16, 18, 20, 22, 24, and 26 described below is for illustrative purposes, and is not intended to be limiting, as any of modules 16, 18, 20, 22, 24, and 26 may provide more or less functionality than is described. For example, one or more of modules 16, 18, 20, 22, 24, and 26 may be eliminated, and some or all of its functionality may be provided by other ones of modules 16, 18, 20, 22, 24, and 26. As another example, processor 14 may be configured to execute one or more additional modules that may perform some or all of the functionality attributed below to one of modules 16, 18, 20, 22, 24, and 26.

Figure 2:
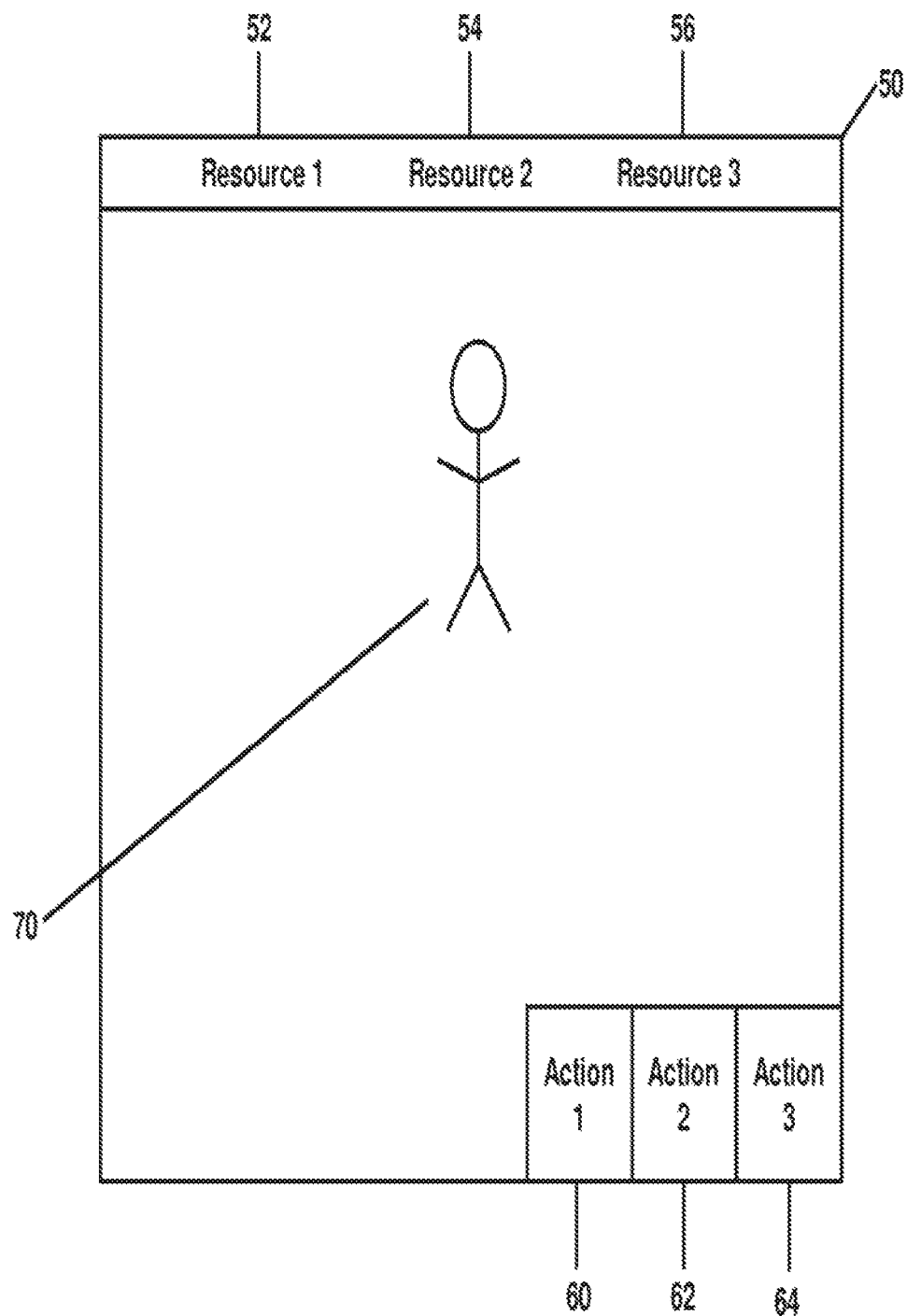
FIG. 2 illustrates a virtual space interface.

FIG. 2 illustrates an embodiment of a virtual space interface 50. Virtual space interface 50 may be configured to display a virtual space 70. Virtual space interface 50 may be configured to display a plurality of resources 52, 54, and 56. Virtual space interface 50 may be configured to allow a user to select a plurality of actions 60, 62, and 64. It should be appreciated that other layouts of virtual space interface 50 are contemplated.

Figure 3:
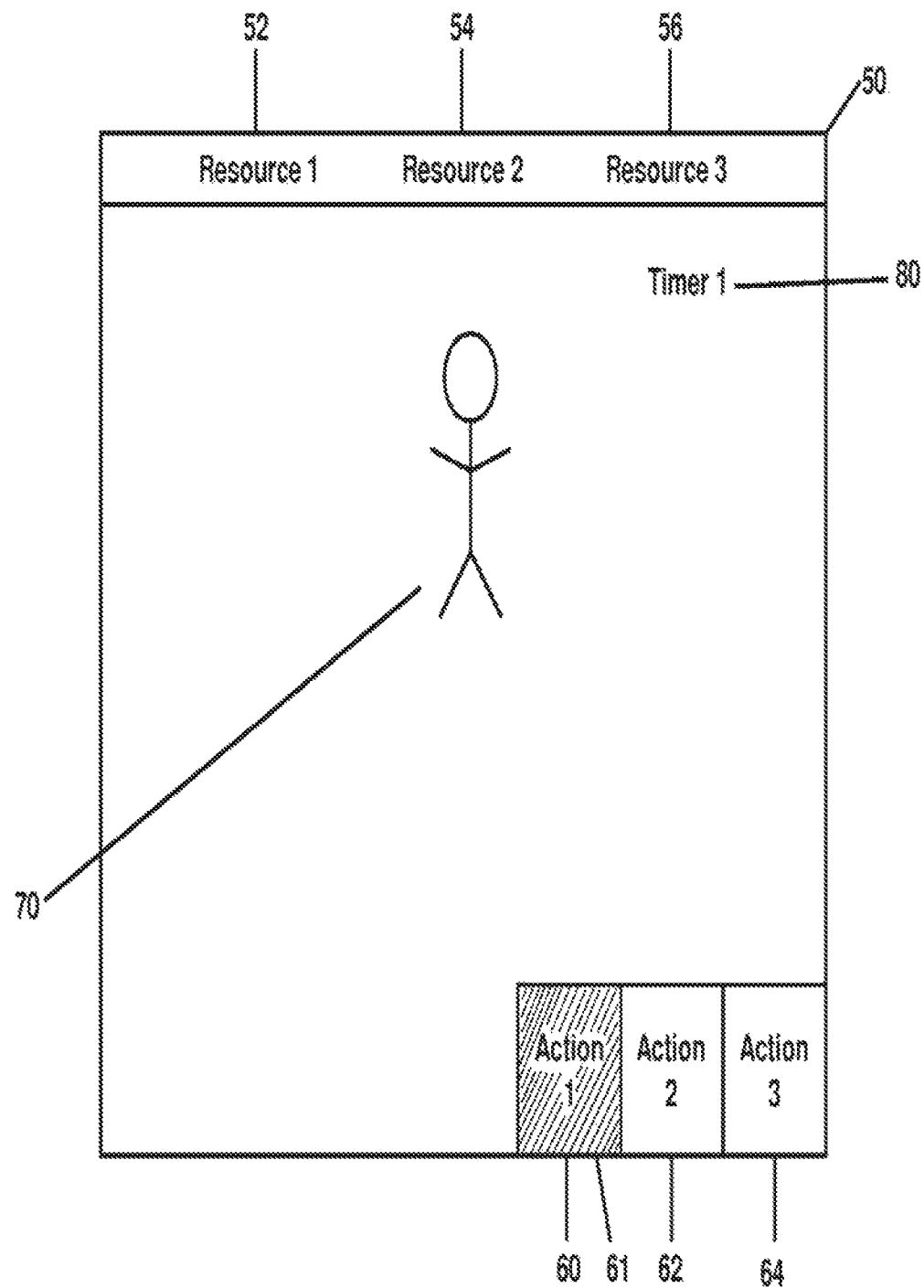
FIG. 3 illustrates a virtual space interface wherein a user has selected an action associated with a wait time.

FIG. 3 illustrates an embodiment of a virtual space interface 50 after a user has selected action 60. Virtual space interface 50 may be configured to display a virtual space 70. Virtual space interface 50 may be configured to display a plurality of resources 52, 54, and 56. Virtual space interface 50 may be configured to allow a user to select a plurality of actions 60, 62, and 64. Virtual space interface 50 may display a timer 80 associated with selected action 60. Virtual space interface 50 may indicate action 60 is selected with an indicator 61. Indicator 61 may indicate that action 60 may not be selected. A user may be prevented from selecting a selected action 60 for some duration of time. The duration of time may be greater than, less than, or equal to the time indicated by timer 80.

Figure 4:
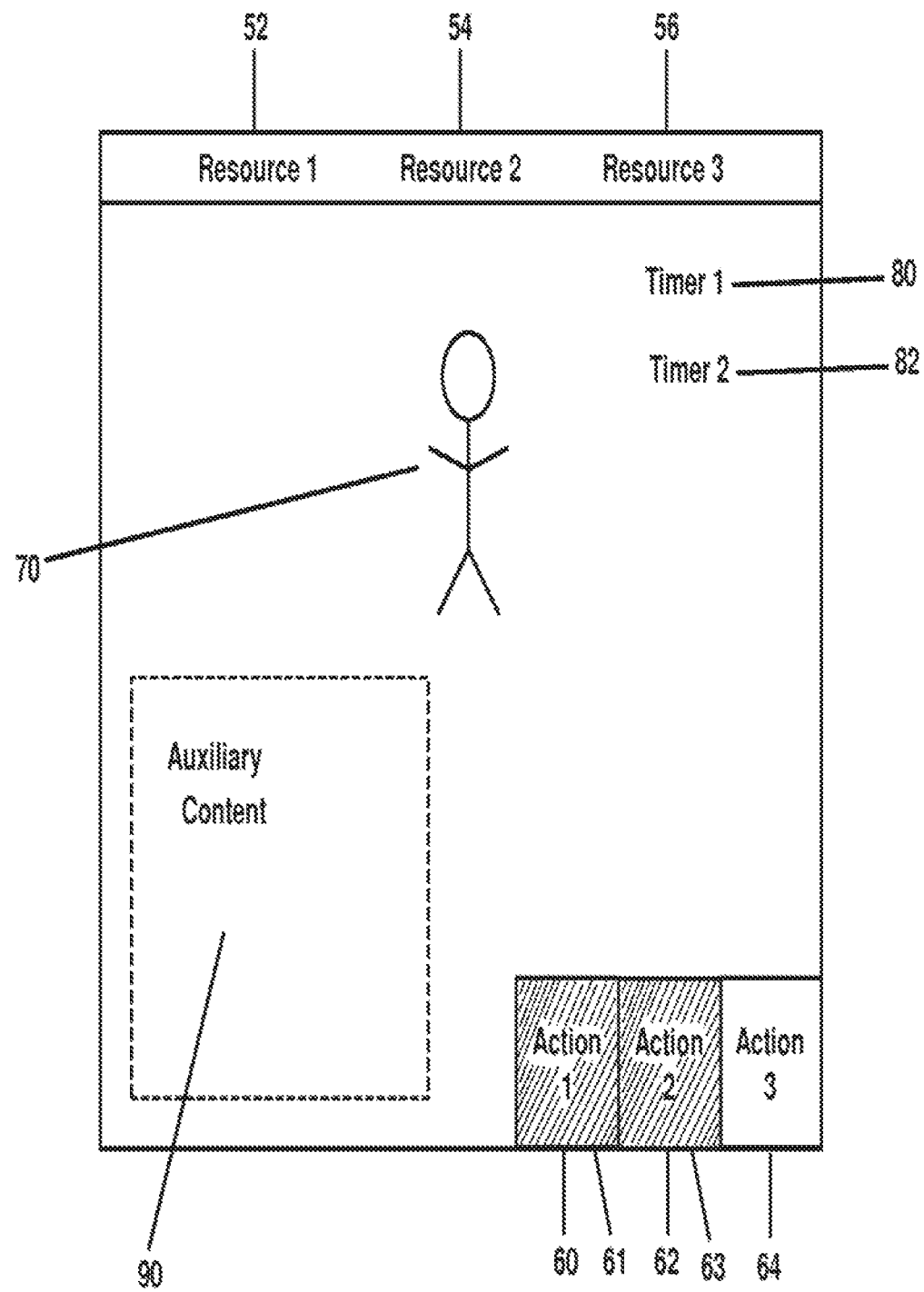
FIG. 4 illustrates a virtual space interface wherein a user has concurrently selected two actions, each action associated with a wait time. This figure also illustrates a virtual space interface displaying auxiliary content.

FIG. 4 illustrates an embodiment of a virtual space interface 50 after a user has selected action 60. Virtual space interface 50 may be configured to display a virtual space 70. Virtual space interface 50 may be configured to display a plurality of resources 52, 54, and 56. Virtual space interface 50 may be configured to allow a user to select a plurality of actions 60, 62, and 64. Virtual space interface 50 may display a timer 80 associated with selected action 60. Virtual space interface 50 may display a timer 82 associated with selected action 62. Virtual space interface 50 may indicate action 60 is selected with an indicator 61. Virtual space interface 50 may indicate action 62 is selected with an indicator 63. Indicators 61 and 63 may indicate that actions 60 and 62 may not be selected, respectively. A user may be prevented from selecting selected actions 60 and 62 for some durations of time. The durations of time may be greater than, less than, or equal to the time indicated by associated timers 80 and 82, respectively. Virtual space interface 50 may include an area for auxiliary content 90; however, it is also contemplated that auxiliary content may be displayed as an overlay of virtual space 70, in virtual space 70, beside virtual space 70, and/or other views.

Figure 5:
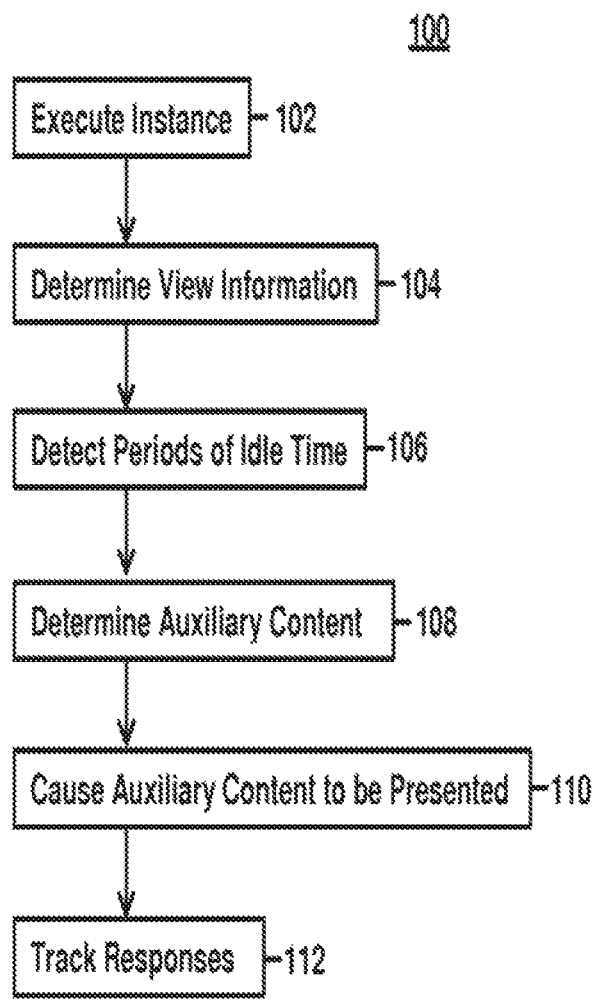
FIG. 5 illustrates a method of hosting a virtual space to client computing devices for interaction by users.

FIG. 5 illustrates a method 100 of hosting a virtual space to client computing devices for interaction by users. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 5 and described below is not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

At an operation 102, an instance of a virtual space may be executed. Operation 502 may be performed by a space module that is the same as or similar to space module 16, in accordance with one or more implementation.

At an operation 104, view information may be determined from the executed instance of the virtual space. The view information may define a view of the virtual space for presentation to a user. Operation 104 may be performed by a module that is the same as or similar to space module 16, in accordance with one or more implementation.

At an operation 106, idle time imposed on a user by wait times of user requested actions may be detected. Operation 106 may be performed by a module that is the same as or similar to idle time module 18, in accordance with one or more implementation.

At an operation 108, auxiliary content to present to a user may be determined. Operation 108 may be performed by a module that is the same as or similar to auxiliary content module 20, in accordance with one or more implementation.

At an operation 110, auxiliary content determined for a user may be presented. Operation 110 may be performed by a module that is the same as or similar to auxiliary content display module 22, in accordance with one or more implementation.

At an operation 112, users' responses to auxiliary content may be tracked. Operation 112 may be performed by a module that is the same as or similar to tracking module 112, in accordance with one or more implementation.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing offers in an online game, the system comprising:
    one or more processors configured by machine-readable instructions to:
        execute an instance of the online game, and to implement the instance to facilitate presentation of a view of the online game to a user, and to facilitate interaction of the user with the online game by executing actions in the instance of the online game in response to receiving action requests from the user, and wherein the actions are associated with wait times of predetermined length that prevent an execution of any corresponding actions and any actions having a common action type with the actions associated with the wait times for an amount of time after the reception of the action request;
        identify a number of different wait times being imposed on the user, wherein each of the different wait times is associated with a different action type, wherein the number of different wait times is two or more;
        detect idle periods of time imposed on the user by the wait times of the requested actions, wherein the idle periods of time indicate multiple wait times are being imposed on the user, and wherein the idle periods of time are detected responsive to a determination that the number of different wait times being imposed meets a threshold number of wait times;
        determine sets of auxiliary content to present to the user along with the view of the online game during the detected idle periods of time;
        cause the sets of auxiliary content to be presented along with the view of the online game to the user during the detected idle periods of time such that responsive to detection of a first idle period, a first set of auxiliary content determined is caused to be presented to the user during the first idle period; and
        monitor responses of the user to the individual sets of auxiliary content during the idle periods of time such that, responsive to presentation of the first set of auxiliary content to the user, a response of the user to the first set of auxiliary content is monitored;
        wherein the sets of auxiliary content are determined based on past responses of the user to previously determined sets of auxiliary content.

2. The system of claim 1, wherein the one or more processors are further configured by machine-readable instructions to determine sets of auxiliary content to present to a user based on a user parameter.

3. The system of claim 1, wherein the common action type is one or more of a troop attack or maneuver, simulated research, unit manufacture and/or training, building construction and/or upgrade, or resource prospecting and/or procurement.

4. The system of claim 1, wherein the one or more processors are further configured by machine-readable instructions to assess the relative effectiveness of offers transmitted to the user based on the response of the user.

5. The system of claim 4, wherein the one or more processors are further configured by machine-readable instructions to determine sets of auxiliary content to present to a user based on a user parameter.

6. The system of claim 1, wherein the one or more processors are configured by machine-readable instructions to detect the idle periods of time based in further part on a determination that a user activity level falls below a threshold activity level.

7. A computer implemented method for providing offers in an online game, the method being implemented in a computer system that includes one or more processors configured by machine-readable instructions, the method comprising:
    executing an instance of the online game, and determining view information from the instance of the online game, wherein the view information defines a view of the online game for presentation to a user;
    coordinating the online game with user interaction by executing actions in the online game in response to receiving action requests from the user, wherein the actions are associated with wait times of predetermined length that prevent an execution of any corresponding actions and any actions having a common action type with the actions associated with the wait times for an amount of time after the reception of the action request;
    identifying a number of different wait times being imposed on the user, wherein each of the different wait times is associated with a different action type, wherein the number of different wait times is two or more;
    detecting periods of idle time imposed on the user by the wait times of the requested actions, wherein the periods of idle time indicate multiple wait times are being imposed on the user, and wherein the periods of idle time are detected responsive to a determination that the number of different wait times being imposed meets a threshold number of wait times;

determining sets of auxiliary content to present to the user along with the view of the online game during detected periods of idle time;

causing the sets of auxiliary content to be presented along with the view of the online game to the user during the detected periods of idle time; and tracking responses of the user to the individual sets of auxiliary content during the periods of idle time;

wherein the sets of auxiliary content are based on past responses of the user to previously determined sets of auxiliary content.

8. The method of claim 7, further comprising determining sets of auxiliary content to present to a user based on a user parameter.

9. The method of claim 7, wherein the common action type is one or more of a troop attack or maneuver, simulated research, unit manufacture and/or training, building construction and/or upgrade, or resource prospecting and/or procurement.

10. The method of claim 7, further comprising assessing the relative effectiveness of offers transmitted to the user based on the response of the user.

11. The method of claim 10, further comprising determining sets of auxiliary content to present to the user based on a user parameter.

12. The method claim of 7, wherein the periods of idle time are further detected based at least in part on a determination that a user activity level falls below a threshold activity level.

* * * * *